United States Patent

[11] 3,601,881

| | | | |
|---|---|---|---|
| [72] | Inventor | Walter Seidewitz<br>Hamburg, Germany | |
| [21] | Appl. No. | 810,586 | |
| [22] | Filed | Mar. 26, 1969 | |
| [45] | Patented | Aug. 31, 1971 | |
| [73] | Assignee | Ottensener Eisenwerk GmbH<br>Hamburg, Germany | |
| [32] | Priority | Mar. 27, 1968 | |
| [33] | | Germany | |
| [31] | | P 17 52 051.3 | |

[54] APPARATUS FOR ASSEMBLING WHEELS OF AUTOMOTIVE VEHICLES OR THE LIKE
22 Claims, 3 Drawing Figs.

[52] U.S. Cl. .................................................... 29/208 R,
  29/200 P
[51] Int. Cl. .................................................... B23p 19/04
[50] Field of Search.......................................... 29/208 R,
  208 C, 200 R, 200 B, 200 P, 407

[56] References Cited
UNITED STATES PATENTS
2,995,810  8/1961  Wilson et al. .................  29/208
3,400,442  9/1968  Morris ..........................  29/208 C

*Primary Examiner*—Gil Weidenfeld
*Attorney*—Michael S. Striker

ABSTRACT: Apparatus for assembling rims and flanges of wheels for automotive vehicles comprises first and second turning devices for respectively locating successively furnished rims and flanges in predetermined angular positions at two separate stations, and a conveyor which transports oriented rims into registry with oriented flanges. The flanges are thereupon inserted into and welded to corresponding rims.

PATENTED AUG 31 1971　　3,601,881

Inventor:
WALTER SEIDEWITZ
BY Michael S. Striker
his ATTORNEY

APPARATUS FOR ASSEMBLING WHEELS OF AUTOMOTIVE VEHICLES OR THE LIKE

BACKGROUND OF THE INVENTION

The present invention relates to an apparatus for assembling wheels which carry the tires of automotive vehicles or the like. More particularly, the invention relates to improvements in apparatus for assembling wheels of the type wherein an annular rim is welded or otherwise secured to a disk-shaped flange which is to be attached to the axle of an automotive vehicle.

It is well known to assemble wheels for automotive vehicles by welding a disk-shaped flange to an annular rim. The rim is formed with a circumferential groove for the tire and has an opening for the tire valve. Such rim is normally formed by suitable deformation of a metallic strip and by butt welding the ends of the deformed strip to each other to form an axially parallel seam. The flange is a disk which is normally provided with short or pronounced radially extending spokes. In assembling the rim with the flange, care must be exercised to insure that the opening for the valve is accessible between the spokes and to further insure that the welded seams which connect the spokes to the rim do not contact the aforementioned seam of the rim. The flange is pressed into the rim and is thereupon permanently secured thereto by resistance welding or in another suitable way.

Proper orientation of the flange with reference to the rim or vice versa and insertion of the flange into the ring preparatory to welding is presently carried out by hand. This is a tedious, time-consuming and tiresome procedure. Furthermore, the quality of the ultimate product depends almost entirely on the skill and conscientiousness of workmen.

SUMMARY OF THE INVENTION

It is an object of my invention to provide an automatic or semiautomatic apparatus for assembling wheels of automotive vehicles in such a way that the quality of each of a series of wheels is the same and that the orientation of component parts in any given wheel is the same as in each other wheel.

Another object of the invention is to provide an apparatus which can assemble wheels in a time-saving operation.

A further object of the invention is to provide an apparatus which can be utilized to assemble different types and/or sizes of wheels.

The improved apparatus serves to assemble wheels of the type wherein an annular rim member is united with a disk-shaped or star-shaped flange member. The apparatus comprises first automatic orienting means for locating each of a series of successively furnished rim members in a predetermined angular position at a first station, second orienting means for locating each of a series of successively furnished flange members in a predetermined angular position at a second station, conveyor means for transporting successive oriented members from one of the stations into registry with successive oriented members at or coming from the other station, and means for inserting oriented flange members into corresponding oriented rim members. Such inserting means can form part of one of the orienting means.

The novel features which are considered as characteristic of the invention are set forth in particular in the appended claims. The improved assembling apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
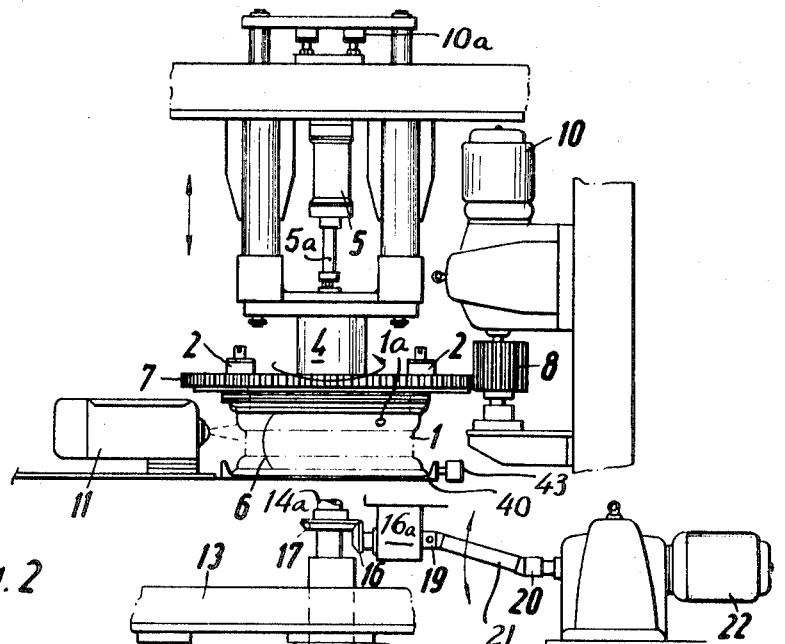
FIG. 1 is a schematic side elevational view of that portion of the apparatus which serves to place successive rims into predetermined angular positions.

FIG. 1 illustrates a first working or orienting station wherein a rim 1 having an axially parallel butt-welded seam 6 is automatically oriented in a predetermined angular position so that its opening 1a for the tire valve faces in a predetermined direction. The orienting means at the station shown in FIG. 1 comprises a support 40 which serves to support the rim 1 from below. In the illustrated embodiment, the support 40 forms part of a conveyor which delivers unoriented rims 1 to the station of FIG. 1 and which thereupon transports oriented rims to a second station shown in FIG. 2. The conveyor may be a chute, a chain conveyor, a belt or any other suitable transporting means which can deliver randomly oriented rims 1 at desired intervals, preferably intermittently. The orienting means further comprises a turning device 4 here shown as including a horizontal gear 7 rotatable about a vertical axis and movable up and down by a displacing cylinder 5. The gear 7 is provided with a set of clamping members 2 which can engage a rim 1 on the support 40 when the cylinder 5 moves the gear to its lower end position and which thereupon grip the rim, preferably after the cylinder 5 slightly lifts the gear 7 so as to disengage the rim from the support 40. The displacing cylinder 5 can be operated by a hydraulic or pneumatic fluid.

The gear 7 meshes with a pinion 8 of considerable length so that these parts mesh regardless of whether the gear 7 moves up or down or dwells in one of its end positions. An electric motor 10 or another suitable prime mover has an output shaft which drives the pinion 8 when the motor 10 is started by a limit switch 10a in the lower end position of the gear 7. An electric control circuit includes a scanning member or detector 11 which is placed adjacent to the support 40 to scan the rim 1 during rotation and to arrest the motor 10 in response to detection of the seam 6. Since the seam is normally in a predetermined position with reference to the opening 1a, detection of the seam 6 and resulting stoppage of the motor 10 is tantamount to such orientation of the rim 1 that the opening 1a is held in a predetermined angular position. The detector 11 is of the well-known type; it preferably comprises a source of light and a photosensitive receiver which produces an impulse when the beam of light issuing from the source impinges on the seam 6. The operation of such detectors is based on the principle that the reflection of light by the smooth external surface of the rim 1 is different from reflection of light by the seam 6. The impulse produced by the detector 11 also causes the cylinder 5 to lift the gear 7 and its clamping members 2 above and away from the oriented rim 1 so that the aforementioned conveyor (shown in FIG. 2 at 41) can transport the rim to the second station where it registers with a dished flange 25. If desired, the impulse produced by the detector 11 can energize a time-delay relay (not shown) which automatically starts the drive for the conveyor 41 with such a delay as is necessary to stop the motor 10 and to actuate the cylinder 5 in order to move the gear 7 and clamping members 2 to their upper end positions.

Figure 2:
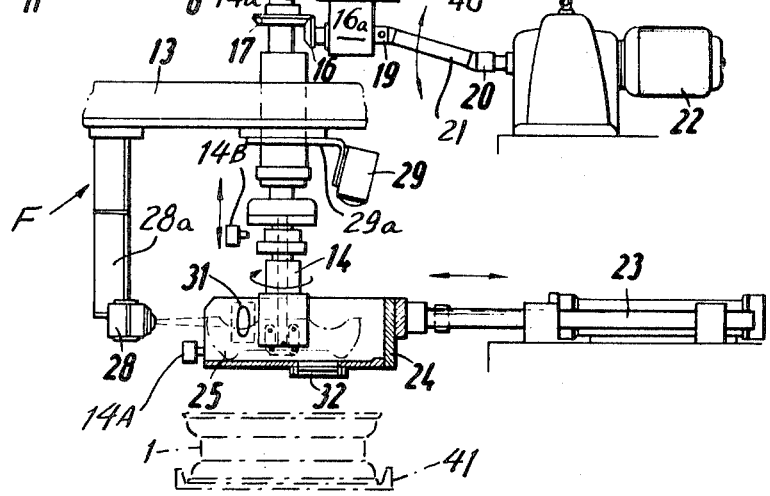
FIG. 2 is a similar schematic side elevational view of a second portion of the apparatus which serves to place successive flanges into predetermined angular positions.
Figure 3:
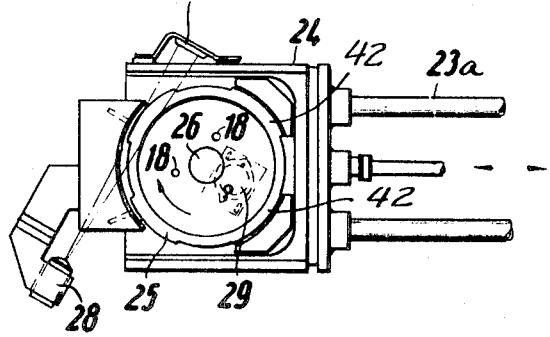
FIG. 3 a plan view of certain parts of the structure shown in FIG. 2.

Referring to FIGS. 2 and 3, the second station accommodates a second orienting device which includes a reciprocable support or receptacle 24 connected to a hydraulically or pneumatically operated transporting cylinder 23. This cylinder can move the receptacle 24 between the position which is shown in FIG. 2 and in which a flange 25 on such receptacle registers with a properly oriented rim 1 on the conveyor 41, and a receiving position in which the receptacle is free to receive an unoriented flange.

A frame F includes a crosshead 13 which supports a turning device including a rotary mandrel 14 which is movable up and down by the piston rod 14a of a hydraulically or pneumatically operated displacing cylinder. The drive means for rotating the mandrel 14 comprises a bevel gear 17 on the mandrel, a mating bevel gear 16 mounted in a bearing 16a which is movable up and down with the piston rod 14a, an electric motor 22, and a Cardanic shaft 21 articulately connected to the gear 16 and output shaft of the motor 22 by universal joints 19, 20.

The flange 25 in the receptacle 24 of FIGS. 2 and 3 has a central aperture 26 which can receive the axle of a vehicle or a portion of the mandrel 14 when the latter is moved to its lower end position. The flange 25 is further provided with several holes 18 which serve to accommodate customary threaded bolts on the axle to insure that the axle can transmit torque to the wheel. The arrangement is such that the mandrel 14 is held by piston rod 14a in raised position when the receptacle 24 moves from the receiving position toward the position shown in FIGS. 2 and 3 to thereby move a fresh flange 25 into registry with an oriented rim 1 on the conveyor 41 and to place its central aperture 26 into axial alignment with the raised mandrel. When the mandrel 14 thereupon descends, its lower portion enters the aperture 26 and engages the flange 25 so that the latter rotates with the mandrel when the motor 22 is started.

The station shown in FIGS. 2 and 3 further accommodates an electric control circuit including two photosensitive scanning devices or detectors 28, 29. These detectors are mounted on brackets 28a, 29a carried by the frame F. The receptacle 24 supports two mirrors 31, 32 which are respectively located in the path of light beams issuing from the light sources of detectors 28, 29 when the receptacle 24 is held in the position shown in FIGS. 2 and 3. The beam issuing from the light source of the detector 29 can reach the mirror 32 when such light beam passes through one of the holes 18 in the flange 25. The beam issuing from the light source of the detector 28 reaches the mirror 31 when such light beam can bypass one of the spokes 42 on the flange 25.

The operation:

The support 40 delivers to the station of FIG. 1 rims 1 in random orientation and at desired (preferably identical) intervals. During such delivery of a randomly oriented rim 1, the gear 7 and its clamping members 2 are held in their upper end positions by the piston rod 5a of the displacing cylinder 5. The support 40 then trips a limit switch 43 which causes the piston rod 5a to move downwardly and to cause the clamping members 2 on the gear 7 to engage the freshly supplied rim. The limit switch 10a then starts the motor 10 so that the gear 7 is driven by the gear 8 and the clamping members 2 rotate with the rim 1 relative to the support 40. Such rotary movement is terminated when the detector 11 detects the seam 6. The detector 11 then produces an impulse which arrests the motor 10 and causes the piston rod 5a to move the gear 7 to the upper end position whereby the clamping members 2 are disengaged from the oriented rim 1. As stated before, the impulse produced by the detector 11 can also serve to start the conveyor 41 with a desired delay so that the oriented rim 1 is transported to the station of FIG. 2 where it comes to a halt in registry with the mandrel 14. The position of the conveyor 41 in FIG. 2 is indicated by phantom lines. If desired, the conveyor 41 can transport a properly oriented rim 1 from the station of FIG. 1, into registry with a suitable press (not shown) which provides it with the opening 1a and thereupon into registry with the mandrel 14. In other words, the rim 1 may have an opening 1a at the time it reaches the station of FIG. 1 or it may be provided with such opening during transport from the station of FIG. 1 to the station of FIG. 2. The arrangement is preferably such that a properly oriented flange 25 is already located at the station of FIG. 2 when the conveyor 41 delivers a properly oriented rim 1.

The operation of the orienting device shown in FIGS. 2 and 3 is as follows: The receptacle 24 receives a fresh flange 25 in random orientation while in the aforementioned retracted position. The control system for the displacing cylinder 23 then receives a signal which causes the piston rod of the cylinder 23 to move the receptacle 24 to the position shown in FIG. 2. The receptacle actuates a limit switch 14A which actuates the displacing cylinder including the piston rod 14a so that the mandrel 14 moves downwardly and its lower portion enters the opening 26 to engage the flange 25. A limit switch 14B then starts the motor 22 so that the mandrel 14 rotates with the flange 25 relative to the receptacle 24. The motor 22 is arrested in response to impulses from the detectors 28 and 29, i.e., when the beam issuing from the light source of the detector 28 can bypass a spoke 42 and reaches the mirror 31 and when the beam issuing from the light source of the detector 29 can pass through an opening 18 and is reflected on the mirror 32. This indicates that the flange 25 if properly oriented with reference to the oriented rim 1 on the conveyor 41. Such combined impulse produced by the detectors 28, 29 preferably also serves to start the cylinder 23 in a direction to move the receptacle 24 to retracted position while the rim 25 adheres to the mandrel 14. The lower portion of the mandrel 14 entering the opening 26 to engage the flange 25 can be of any conventional work holding structure, such as expansible fingers or electromagnets. The piston rod 14a is then caused to move to its lower most position whereby the mandrel 14 inserts the properly oriented flange 25 into the properly oriented rim 1 on the conveyor 41. In the next step, the mandrel 14 is disengaged from the flange 25 and is returned to its uppermost position so that the receptacle 24 can deliver a fresh flange 25. The conveyor 41 is set in motion and transports the parts 1, 25 to a welding station, not shown, where the spokes 42 are welded to the rim 1. Prior to welding, the parts 1 and 25 can be transported through a press which forces the flange 25 into the rim 1 so that these parts are held in optimum positions for welding to each other. It is clear that welding is but one of the methods by which the parts 1, 25 can be connected to each other.

An important advantage of the just described apparatus is that all steps in the assembly of successive rims 1 with successive flanges 25 can be carried out in a fully automatic way, rapidly, with maximum reproducibility, and without any physical effort on the part of attendants.

The construction of control circuits at the stations shown in FIGS. 1 and 2 is preferably such that the detectors 28, 29, the conveyor 41, a properly oriented rim 1 or the cylinder 23 automatically triggers the downward movement of a properly oriented flange 25 by way of the mandrel 14 when the rim reaches the station of FIG. 2.

The conveyor 41 or the oriented rim 1 thereon can also trigger operation of the cylinder 23 to retract the support 24 to receiving position before an oriented rim reaches the station of FIG. 2, i.e., movements of the receptacle 24 between its positions are synchronized with movements of the conveyor 41.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended

I claim:

1. In an apparatus for assembling wheels of automotive vehicles of the type wherein a rim member is united with a flange member, a combination comprising first orienting means for locating successive rim members in a predetermined angular position at first station; second orienting means for locating successive flange members in a predetermined angular position at a second station; conveyor means for transporting successive oriented members from one of said stations into a position of registry with members which are oriented at the other station, and means for placing said members relatively to each other in a predetermined planar position in which the members are to be united.

2. A combination as defined in claim 1, wherein said conveyor means is arranged to transport oriented rim members into registry with oriented flange members at said second station.

3. A combination as defined in claim 1, wherein said first orienting means comprises support means for rim members, rotary turning means for rotating a rim member with reference to said support means, drive means for rotating said turning means, and displacing means for moving said turning means into and away from engagement with a rim member on said support means.

4. A combination as defined in claim 3, wherein said turning means is rotatable about a substantially vertical axis.

5. A combination as defined in claim 3, wherein said displacing means comprises a fluid-operated cylinder and piston unit.

6. A combination as defined in claim 3, wherein said drive means comprises an electric motor having a rotary output member, said turning means comprising a gear-receiving torque from said output member and having clamping means movable by said gear into and away from engagement with a rim member on said support means.

7. A combination as defined in claim 3, further comprising control means including scanning means for determining the angular position of a rim member at said first station and for arresting said drive means when the rim member assumes said predetermined angular position.

8. A combination as defined in claim 7, wherein said scanning means comprises a photosensitive detector.

9. A combination as defined in claim 1, wherein said second orienting means comprises support means for a flange member at said second station, rotary turning means for rotating a flange member with reference to said support means, drive means for rotating said turning means, said placing means including displacing means for moving said turning means into and away from engagement with a flange member on said support means.

10. A combination as defined in claim 9, wherein said drive means comprises an electric motor having a rotary output member and an articulated torque transmitting connection between said output member and said turning means.

11. A combination as defined in claim 10, wherein said turning means is movable axially into and away from engagement with a flange member on said support means and further comprising frame means movably supporting said turning means.

12. A combination as defined in claim 9, wherein said support means comprises a receptacle movable between a receiving position in which it receives a flange member and a second position in which the flange member thereon registers with said turning means.

13. A combination as defined in claim 12, further comprising fluid-operated transporting means for moving said receptacle between receiving and second positions.

14. A combination as defined in claim 12, further comprising control means including at least one scanning means for determining the angular position of a flange member at said second station in the second position of such receptacle and for arresting said drive means when a flange member assumes said predetermined position.

15. A combination as defined in claim 14, wherein said control means comprises a plurality of scanning means and wherein each of said scanning means comprises a photosensitive detector.

16. A combination as defined in claim 15, wherein each of said detectors comprises a light source and wherein each of said scanning means further comprises a reflecting surface provided on said receptacle and arranged to reflect light from the respective source only in the predetermined angular position of a flange member at said second station.

17. A combination as defined in claim 16, wherein each flange member has a hole and wherein light emitted by the source of one of said detectors can reach the respective reflecting surface by way of the hole of a properly oriented flange member at said second station.

18. A combination as defined in claim 16, wherein each flange member has substantially radially extending spokes at least one of which prevents light emitted by the source of one of said detectors from reaching the respective reflecting surface when the corresponding flange member is in other than said predetermined angular position.

19. A combination as defined in claim 14, wherein said turning means is movable to an end position to thereby insert a properly oriented flange member into the registering oriented rim member in retracted position of said receptacle.

20. A combination as defined in claim 19, wherein said control means comprises means for moving said turning means to said end position in response to stoppage of said drive means by said scanning means.

21. A combination as defined in claim 20, wherein said control means comprises means for moving said receptacle to receiving position in response to stoppage of said drive means by said scanning means.

22. A combination as defined in claim 12, wherein said receptacle is movable between said positions thereof in synchronism with movements of said conveyor means.